(12) United States Patent
Satran et al.

(10) Patent No.: US 6,196,769 B1
(45) Date of Patent: Mar. 6, 2001

(54) CUTTING TOOL ASSEMBLY AND CUTTING INSERT THEREFOR

(75) Inventors: Amir Satran; Yosef Weberman, both of Kfar Vradim (IL)

(73) Assignee: Iscar Ltd., Migdal Tefen (IL)

(*) Notice: Subject to any disclaimer, the term of this patent is extended or adjusted under 35 U.S.C. 154(b) by 0 days.

(21) Appl. No.: 09/294,399

(22) Filed: Apr. 20, 1999

(30) Foreign Application Priority Data

May 5, 1998 (IL) ........................................ 124328

(51) Int. Cl.[7] ........................................ B26D 1/12
(52) U.S. Cl. .................. 407/40; 407/42; 407/47; 407/50; 407/53
(58) Field of Search .................. 407/40, 41, 42, 407/47, 49, 50, 58, 60, 62, 113, 116, 110, 117

(56) References Cited

U.S. PATENT DOCUMENTS

| 2,188,743 | * | 1/1940 | Severson | 407/49 |
|---|---|---|---|---|
| 2,392,216 | * | 1/1946 | Anania | 407/84 |
| 2,870,523 | * | 1/1959 | Richard | 407/6 |
| 3,380,137 | * | 4/1968 | MacPetrie et al. | 407/35 |
| 3,827,119 | * | 8/1974 | Bennett | 407/40 |
| 4,344,724 | | 8/1982 | Kress et al. . | |
| 4,462,725 | * | 7/1984 | Satran et al. | 407/92 |
| 4,493,596 | | 1/1985 | Grunsky et al. | 408/233 |
| 5,071,291 | * | 12/1991 | Kaminski | 407/30 |
| 5,454,671 | * | 10/1995 | Qvarth | 407/42 |
| 5,580,194 | | 12/1996 | Satran et al. . | |
| 5,971,671 | * | 10/1999 | Mina | 407/42 |

FOREIGN PATENT DOCUMENTS

| 32 04 210 A1 | 2/1982 | (DE) . |
|---|---|---|
| 42 39 311 C2 | 4/1996 | (DE) . |
| 0 216 064 A1 | 7/1986 | (EP) . |
| 172820 | 12/1991 | (GB) . |

* cited by examiner

Primary Examiner—Henry Tsai
(74) Attorney, Agent, or Firm—Pennie & Edmonds LLP

(57) ABSTRACT

A cutting tool assembly rotatable about an axis of rotation having a tool in which a replaceable insert is mountable. The tool has two clamping jaws spaced apart by an insert receiving slot. The insert has top and bottom surfaces each of which has two abutting surfaces. The abutting surfaces have a rear abutting portion and a front abutting portion and in accordance with one embodiment the insert is thicker at its rear abutting portion than at its front abutting portion. This structure of the insert provides positive axial locking of the insert, ensuring no axial movement of the insert relative to the tool during machining. The abutting surfaces of the top surface slope towards each other and inwardly towards a central portion of the insert. Similarly, the abutting surfaces of the bottom surface slope towards each other and inwardly towards the central portion of the insert. The insert is thereby effectively radially clamped by the clamping jaws in a double dove-tail manner.

35 Claims, 12 Drawing Sheets

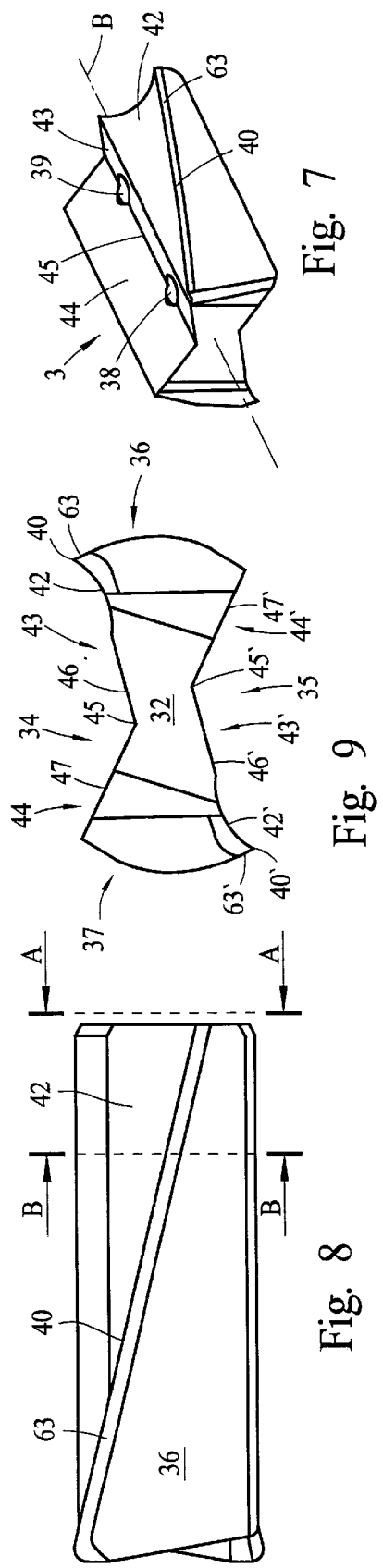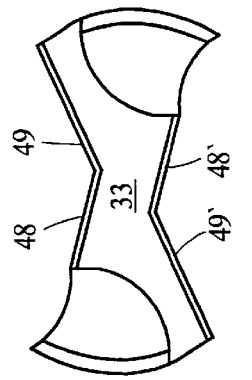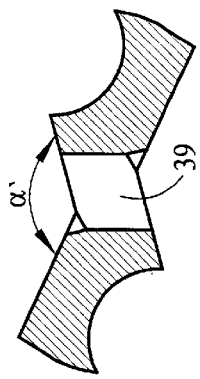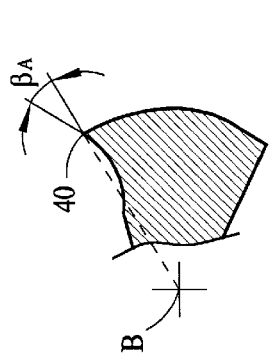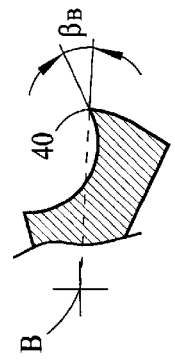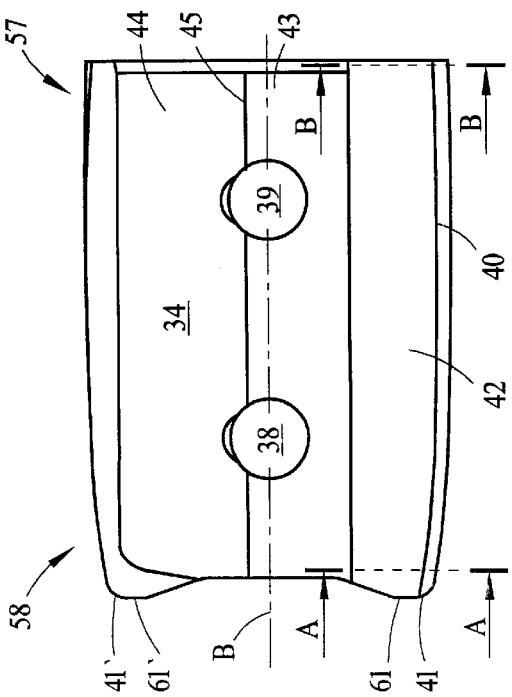

CUTTING TOOL ASSEMBLY AND CUTTING INSERT THEREFOR

FIELD OF THE INVENTION

The present invention relates to a cutting tool assembly having a replaceable insert for use in rotary machining operations in general and in finishing applications in particular.

BACKGROUND OF THE INVENTION

In known end milling cutters having indexable inserts, the inserts are arranged on the periphery of the tool and fastened thereto by means of clamping screws. When machining a surface whose height is greater than the height presented by the cutting edge of a single insert, an extended flute milling cutter is used whereby several inserts are arranged along the periphery of the tool in such an arrangement so as to effectively constitute a single long cutting edge.

The extended flute milling cutter, which is efficient for rough end milling operations, has several disadvantages when performing finishing operations: (i) radial mismatch between the inserts, on the same flute or on different flutes, causes unevenness of the machined surface, (ii) the angular pitch between the inserts decreases web thickness and thereby tool strength, (iii) the reliability of the entire tool depends on many components thereby increasing the chance for failure.

When performing finishing applications with tools having replaceable inserts at high speeds, e.g. in the range of 10,000 to 30,000 rpm, stability problems limits the use of conventional clamping systems.

In view of the foregoing, it should be apparent that there exists a need to provide a cutting tool that will eliminate, or reduce to within acceptable limits, the above mentioned problems and disadvantages.

SUMMARY OF THE INVENTION

In accordance with the present invention there is provided a cutting tool assembly, rotatable about an axis of rotation A, comprising a tool, a replaceable insert mountable therein and at least one clamping screw, said tool comprises two substantially equal clamping jaws spaced apart by an insert receiving slot, each of said clamping jaws is provided with at least one screw bore and comprises a peripheral surface, peripheral abutment surface and central abutment surface, said peripheral abutment surface and said central abutment surface being substantially parallel to said axis of rotation, said insert is of a generally prismatic shape having an axis of rotation B and comprising a central portion, a front surface, a rear surface, top and bottom surfaces having at least one through bore aligned with said at least one screw bore, and side surfaces on opposite sides of said axis of rotation, said side surfaces merging with said top and bottom surfaces at edges, at least one of said edges being a cutting edge, each of said top and bottom surfaces comprising first and second abutting surfaces, each of said first and second abutting surfaces terminating in a front abutting portion having, respectively, central and peripheral front edge lines, and in a rear abutting portion having, respectively, central and peripheral rear edge lines, said peripheral front edge lines being parallel to said peripheral rear edge lines, and said central front edge lines being parallel to said central rear edge lines, said first and second abutting surfaces of said top surface slope towards each other and inwardly towards the central portion of said insert and said first and second abutting surfaces of said bottom surface slope towards each other and inwardly towards the central portion of said insert.

There is also provided in accordance with the present invention an insert for clamping in a clamping tool between clamping jaws, said insert being of a generally prismatic shape having an axis of rotation B and comprising a central portion, a front surface, a rear surface, top and bottom surfaces and side surfaces on opposite sides of said axis of rotation, said side surfaces merging with said top and bottom surfaces at edges, at least one of said edges being a cutting edge, each of said top and bottom surfaces comprising first and second abutting surfaces, each of said first and second abutting surfaces terminating in a front abutting portion having, respectively, central and peripheral front edge lines and in a rear abutting portion having, respectively, central and peripheral rear edge lines, said first and second abutting surfaces of said top surface slope towards each other and inwardly towards said central portion of said insert and wherein said first and second abutting surfaces of said bottom surface slope towards each other and inwardly towards said central portion of said insert.

Preferably, said insert is thicker at its rear abutting portion than at its front abutting portion Typically, said first and second abutting surfaces follow an elastic bending curve of said clamping jaws.

If desired, said first and second abutting surfaces are flat.

Preferably, said cutting edge follows a spiral path about the axis of rotation B.

Further preferably, said insert has two through bores.

Generally, said first and second abutting surfaces of said top surface are connected by a first intermediate surface and said first and second abutting surfaces of said bottom surface are connected by a second intermediate surface.

Preferably, said first and second intermediate surfaces are located on either side of a vertical plane V passing through the axis of rotation of the insert when the insert is oriented horizontally.

Further preferably, said first and second intermediate surfaces are located at equal distances from said vertical plane.

In accordance with one embodiment of the invention, said first and second intermediate surfaces are lines.

In accordance with another embodiment of the invention, said first and second intermediate surfaces have straight cross-sections in a plane perpendicular to the axis of rotation B.

In accordance with another embodiment of the invention, said first and second intermediate surfaces have curved cross-sections in a plane perpendicular to the axis of rotation B.

In accordance with the present invention, said peripheral and central abutment surfaces form between them an angle $\alpha$.

Further in accordance with the present invention, said first and second abutting surfaces of said insert top surface form between them an angle $\alpha'$ and wherein said first and second abutting surfaces of said insert bottom surface form between them an angle $\alpha'$.

Preferably, said angle $\alpha'$ is smaller than said angle $\alpha$.

If desired, said insert receiving slot terminates in an intermediate slot.

Further if desired, said intermediate slot terminates in a stress equalizing flexibilizing bore.

Preferably, said at least one through bore is provided in said top and bottom surfaces.

In accordance with one embodiment of the invention there is provided a cutting tool assembly rotatable about an axis of rotation A comprising a tool, a replaceable insert mountable therein and at least one clamping screw, said tool comprises two substantially equal clamping jaws spaced apart by an insert receiving slot having at least one rear abutment surface, each of said clamping jaws is provided with at least one screw bore slanted at an angle δ with respect to a line perpendicular to the axis of rotation of the cutting tool assembly and having at least one screw bore tapered portion, each of said clamping jaws comprises a peripheral surface, peripheral abutment surface and central abutment surface, said peripheral abutment surface and said central abutment surface being substantially parallel to said axis of rotation;

said insert is of a generally prismatic shape having an axis of rotation B and comprising a central portion, a front surface, a rear surface, top and bottom surfaces having at least one through bore substantially aligned with said at least one screw bore, and side surfaces on opposite sides of said axis of rotation, said side surfaces merging with said top and bottom surfaces at edges, at least one of said edges being a cutting edge, each of said top and bottom surfaces comprising first and second abutting surfaces, each of said first and second abutting surfaces terminating in a front abutting portion having, respectively, central and peripheral front edge lines, and in a rear abutting portion having, respectively, central and peripheral rear edge lines, said peripheral front edge lines being parallel to said peripheral rear edge lines, and said central front edge lines being parallel to said central rear edge lines, said first and second abutting surfaces of said top surface slope towards each other and inwardly towards the central portion of said insert and said first and second abutting surfaces of said bottom surface slope towards each other and inwardly towards the central portion of said insert.

said clamping screw (307) has an axis E, a screw head tapered portion (325), a screw cylindrical portion (326) slanted at an angle δ with respect to the axis E and a screw threaded portion (327), in an assembled position the insert rear abutment surface (33) abuts the at least one rear abutment surface (14, 15), the screw cylindrical portion (326) abuts the at least one insert through bore (38, 39), the screw head tapered portion (325) abuts the screw bore tapered portion (331) and the peripheral abutment surfaces (12) and central abutment surfaces (13) of the clamping jaws (9, 10) abut the first and second abutting surfaces (43, 43', 44, 44') of the insert.

There is yet further provided in accordance with the present invention a tool rotatable about an axis of rotation A comprising two substantially equal parallel clamping jaws spaced apart by an insert receiving slot, each of said clamping jaws is provided with at least one screw bore and comprises a peripheral surface, peripheral abutment surface and central abutment surface, said peripheral abutment surface and said central abutment surface being substantially parallel to said axis of rotation.

BRIEF DESCRIPTION OF THE DRAWINGS

For a better understanding of the present invention and to show how the same may be carried out in practice, reference will now be made to the accompanying drawings, in which

FIG. 7 is a perspective view of an insert according to the present invention;

FIG. 8 is a side view of the insert shown in FIG. 7;

FIG. 8A is a rear view of the insert shown in FIG. 8 viewed from direction A—A;

FIG. 8B is a cross-sectional view of the insert shown in FIG. 8 taken along line B—B;

FIG. 9 is a front view of the insert shown in FIG. 7;

FIG. 10 is a top view of the insert shown in FIG. 7;

FIG. 10A is a cross-sectional partial view of the insert shown in FIG. 10 taken along line A—A;

FIG. 10B is a cross-sectional partial view of the insert shown in FIG. 10 taken along line B—B;

DETAILED DESCRIPTION OF PREFERRED EMBODIMENTS

Figure 1:
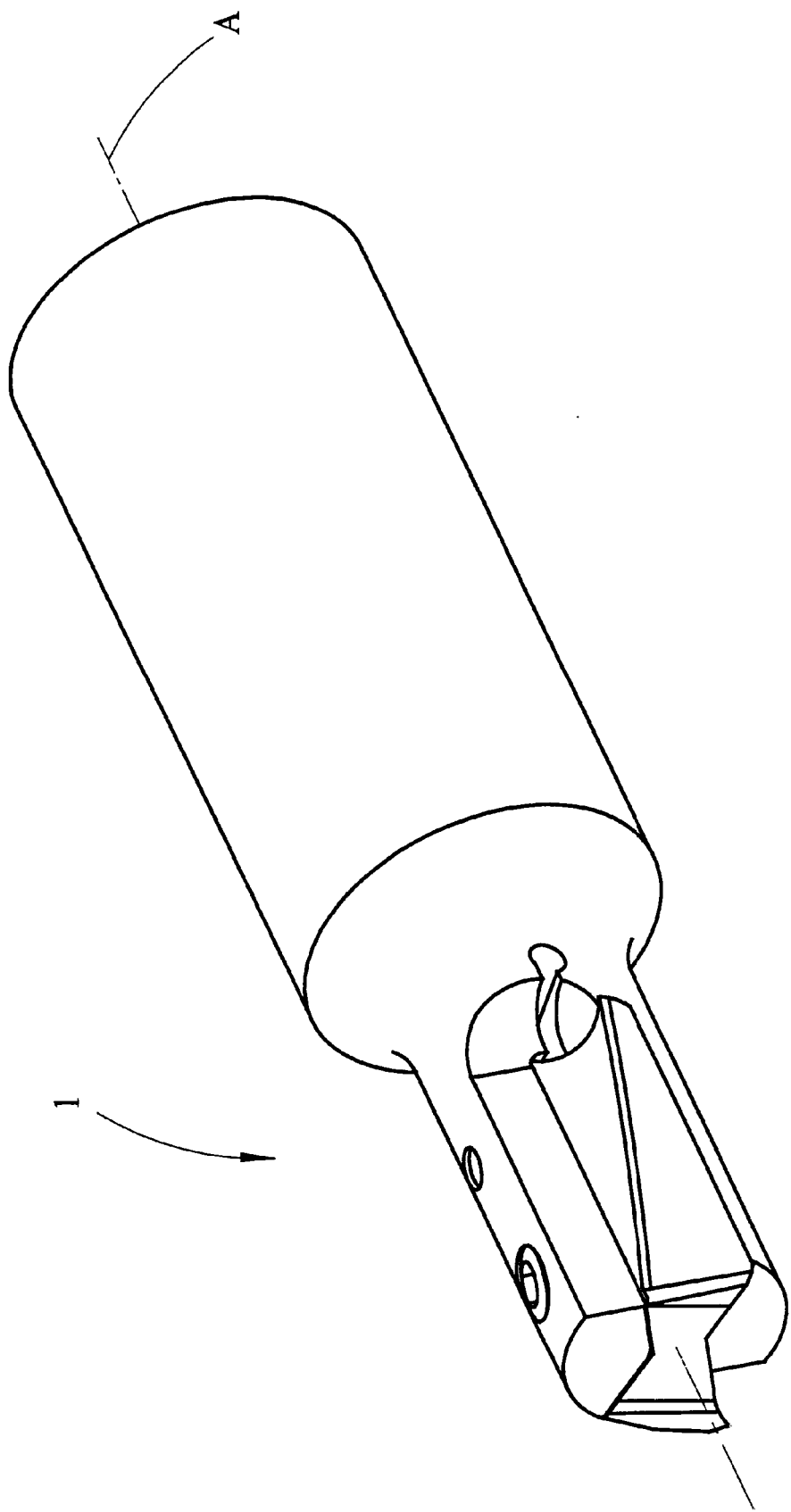
FIG. 1 is a perspective view of a cutting tool assembly according to the present invention.
Figure 2:
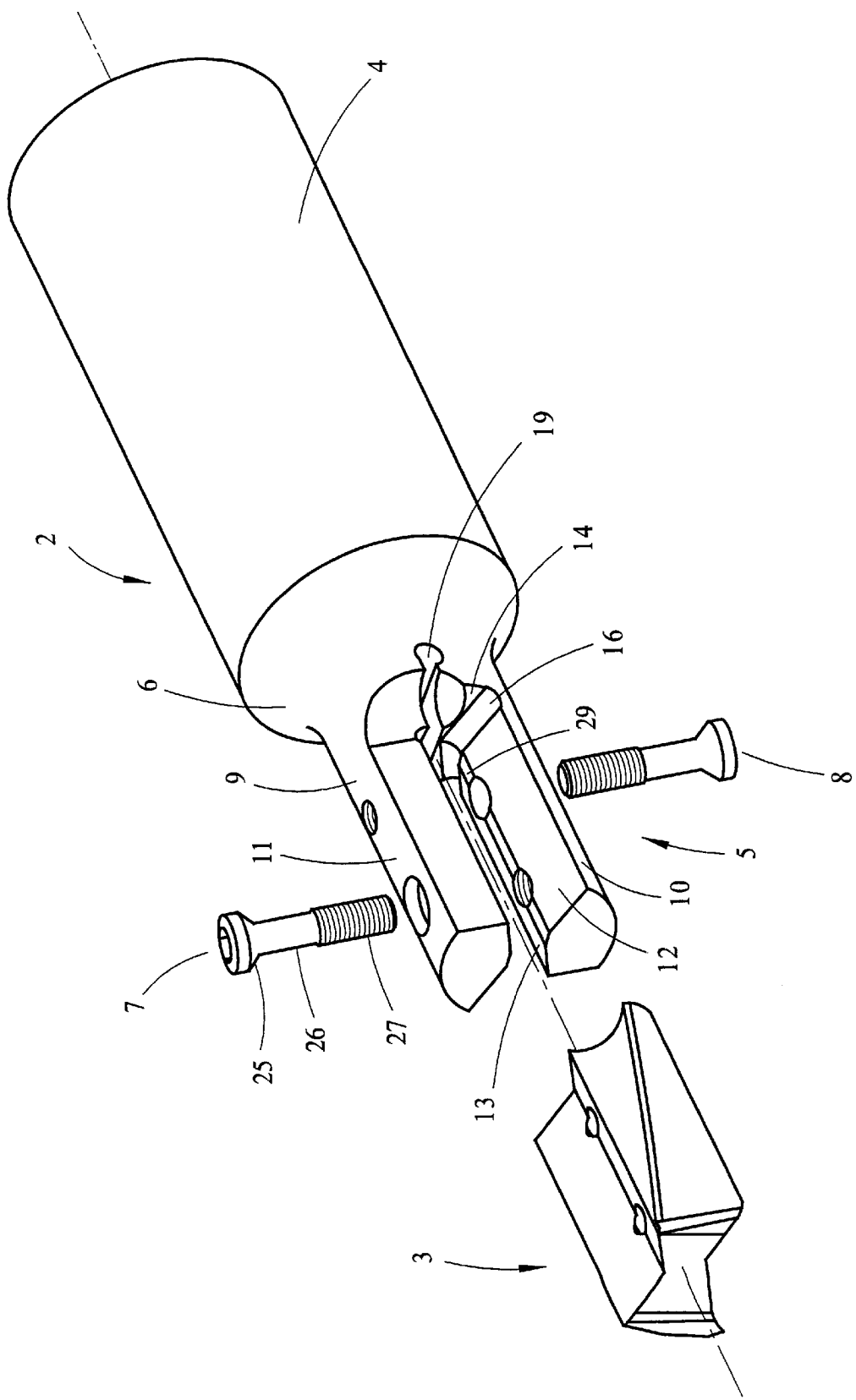
FIG. 2 is an exploded view of the cutting tool assembly shown in FIG. 1.
Figure 3:
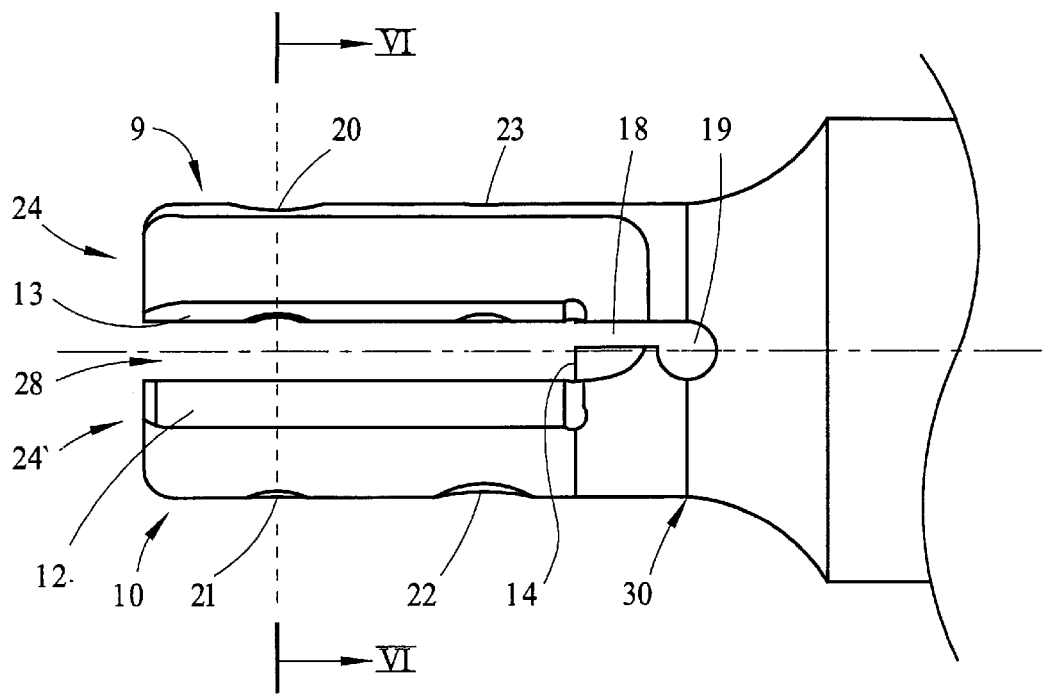
FIG. 3 is a partial side view of the tool shown in FIG. 2.
Figure 4:
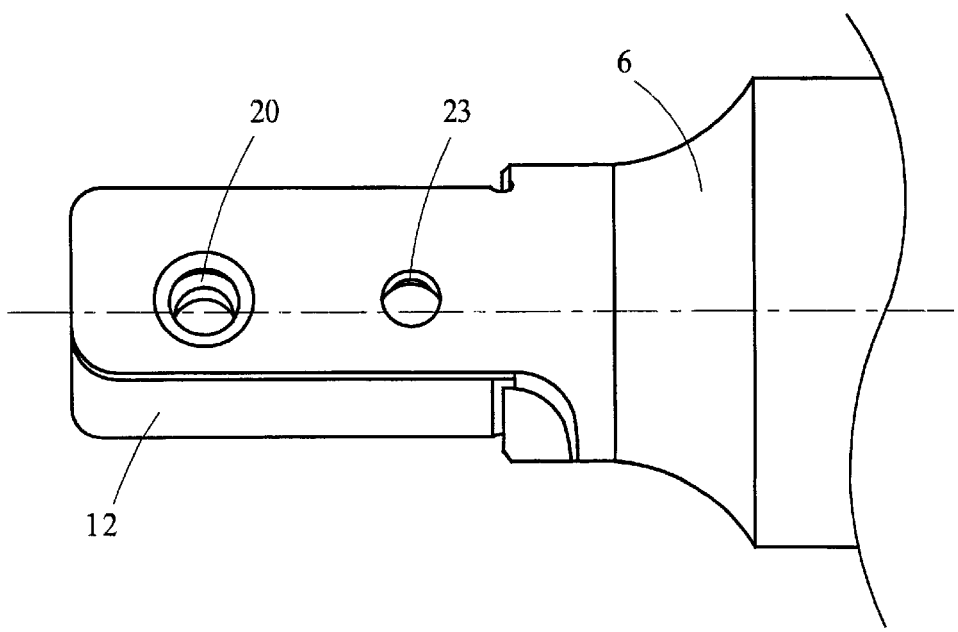
FIG. 4 is a partial top view of the tool shown in FIG. 2.

Attention is first drawn to FIGS. 1 and 2 showing a cutting tool assembly 1 rotatable about an axis of rotation A, comprising a tool 2, a replaceable insert 3 and clamping screws 7 and 8. Each clamping screw consists of screw head tapered portion 25, screw cylindrical portion 26 and screw threaded portion 27. The tool 2 consists of a body portion 4, clamping portion 5 and intermediate portion 6 therebetween. Clamping portion 5 is formed by two spaced apart substantially equal parallel clamping jaws 9 and 10. As best seen in FIG. 2, the clamping portion has unitary construction, being formed as a single piece of material. As can be seen in FIGS. 2 to 6, each clamping jaw consists of a peripheral surface 11, preferably cylindrical, peripheral abutment surface 12 and central abutment surface 13, all of which are parallel to the axis of rotation A. On each clamping jaw, peripheral abutment surface 12 and central abutment surface 13 are joined by connecting surface 29. It should be noted that connecting surface 29 can be of several shapes and does not generally constitute an abutment surface. Both connecting surfaces 29 are preferably parallel to each other and to axis A. In an extreme case, either one, or both of connecting surfaces 29 can be reduced to a line at which a peripheral abutment surface 12 and a central abutment surface 13 meet. Both clamping jaws 9 and 10 are formed with front and rear screw bores. Clamping jaw 9 is provided, near its front end 24 with a front screw bore 20 aligned co-axially with front threaded screw bore 21 provided near front end 24' of clamping jaw 10, and, with rear threaded screw bore 23 aligned co-axially with rear screw bore 22 provided in clamping jaw 10. Clamping screws 7 and 8 are screwed into the clamping portions from opposite directions thereby providing substantially the same stress on the peripheral surfaces of the clamping jaws, when clamped.

Clamping jaws 9 and 10 are provided therebetween with an insert receiving slot 28, directed parallel to the axis of rotation A. Clamping jaw 10 is provided with stress relief channel 16 which merges with first rear abutment surface 14. Clamping jaw 9 is provided with stress relief channel 17 which merges with second rear abutment surface 15. Adjacent the rear end of insert receiving slot 28 is intermediate slot 18 directed parallel to the axis of rotation A. The rear end of intermediate slot 18 terminates in a stress equalizing flexibilizing bore 19 located at the base 30 of the clamping jaws. Stress equalizing flexibilizing bore 19 terminates at the intermediate portion 6 of tool 2 and is directed transversely to axis A, passes therethrough, and being remote from the clamping jaws adds flexibility to their gripping action.

Figure 5:
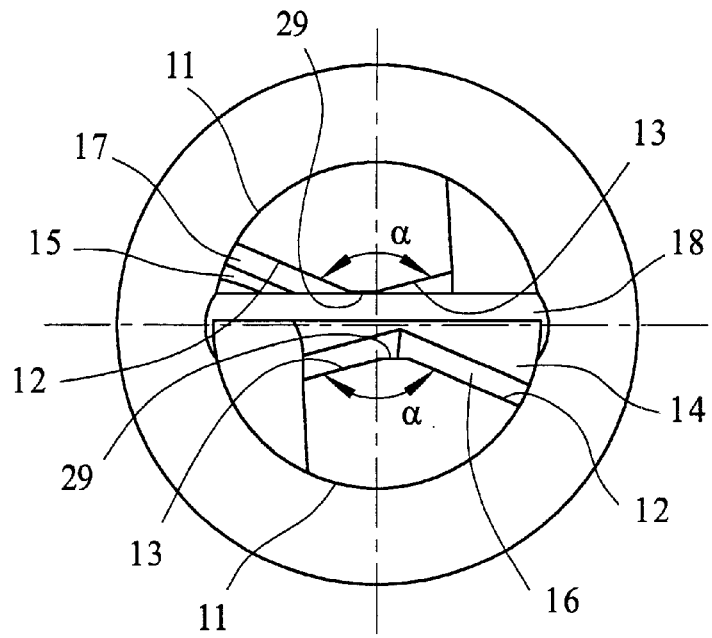
FIG. 5 is a front view of the tool shown in FIG. 2.
Figure 6:
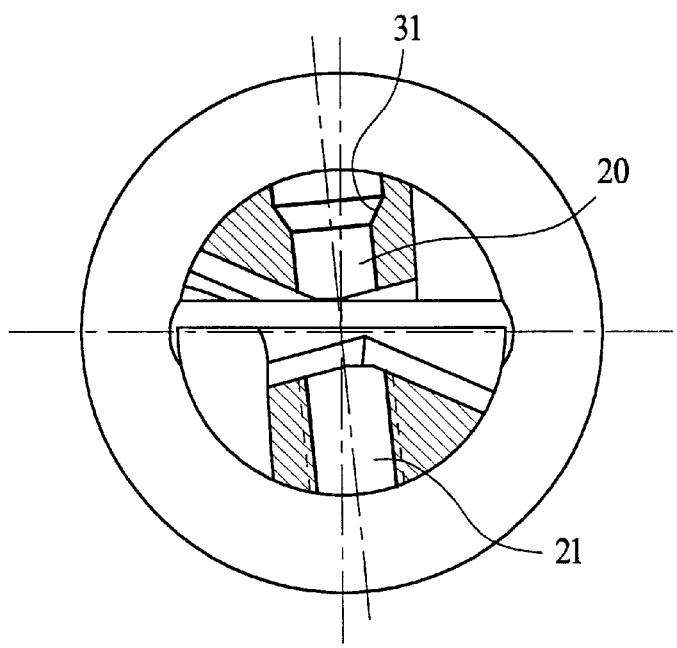
FIG. 6 is a cross-sectional view of the tool shown in FIG. 3 taken along line VI—VI.

As can be best seen in FIG. 5, peripheral abutment surfaces 12 on both clamping jaws are parallel but not co-planar and do not cross axis A. Similarly, central abutment surfaces 13 on both clamping jaws are parallel but not co-planar and do not cross axis A. On each clamping jaw, peripheral and central abutment surfaces 12 and 13 form between them an angle α. As can be seen in FIG. 6, front screw bore 20 has a tapered portion 31 serving as an abutment surface for screw head tapered portion 25 of clamping screw 7 shown in FIG. 2. A similar construction applies for the rear screw bore 22 and clamping screw 8.

As can be seen in FIGS. 7 to 10, the insert 3 is of a generally prismatic shape with 180° rotational symmetry about an axis of rotation B and consists of front surface 32, rear surface 33, identical top and bottom surfaces 34 and 35, respectively, and identical side surfaces 36 and 37 which include relief surfaces 63 and 63', respectively. Front and rear through bores 38 and 39, respectively, are disposed so as to be aligned, when the insert is mounted in the tool, with front and rear screw bores of the clamping jaws and capable to freely receive therethrough clamping screws 7 and 8, respectively. In a different arrangement between the screws and the through bores of the insert the through bores do not freely receive therethrough the clamping screws as will be described later. When the insert is clamped in the tool its axis of rotation B coincides with the axis of rotation A of the tool.

Top surface 34 merges with side surface 36 at cutting edge 40 which terminates, at its front end at cutting corner 41 followed by wiper 61. Similarly, bottom surface 35 merges with side surface 37 at cutting edge 40' which terminates, at its front end at cutting corner 41' followed by wiper 61'. Top surface 34 comprises first and second abutting surfaces 43 and 44, respectively, connected by an intermediate surface 45, which, in the present embodiment, is reduced to a line, and rake surface 42 extending from cutting edge 40 along the entire length of the insert top surface and merging with first abutting surface 43. Similarly, bottom surface 35 comprises first and second abutting surfaces 43' and 44', respectively, connected by an intermediate surface 45', which, in the present embodiment, is also reduced to a line, and rake surface 42' extending from cutting edge 40' along the entire length of the insert bottom surface and merging with first abutting surface 43'.

First and second abutting surfaces 43 and 44 of insert top surface 34 form between them an angle α' and slope inwardly towards intermediate surface 45. Similarly, first and second abutting surfaces 43' and 44' of insert bottom surface 35 form between them an angle α' and slope inwardly towards intermediate surface 45'. The angle α' is preferably smaller than the angle α between the clamping jaws' peripheral and central abutment surfaces 12 and 13, respectively. In view of this construction of the insert and the clamping jaws, the insert is effectively radially clamped in a double dove-tail manner with peripheral abutment surface 12 and central abutment surface 13 of clamping jaw 9 abutting second abutting surface 44 and first abutting surface 43 of the insert, respectively, and with peripheral abutment surface 12 and central abutment surface 13 of clamping jaw 10 abutting second abutting surface 44' and first abutting surface 43' of the insert, respectively.

As can be seen in front and rear views in FIGS. 9 and 8A, respectively, for top surface 34, first and second abutting surfaces 43 and 44 terminate, at their front portion, in respective central and peripheral front edge lines 46 and 47, and, in their rear portion, in respective central and peripheral rear edge lines 48 and 49. Similarly, for bottom surface 35, first and second abutting surfaces 43' and 44' terminate, at their front portion, in respective central and peripheral front edge lines 46' and 47', and, at their rear portion, in respective central and peripheral rear edge lines 48' and 49'. Central front edge lines 46 and 46'are parallel to each other, as are peripheral front edge lines 47 and 47'. Similarly, central rear edge lines 48 and 48' are parallel to each other as are peripheral rear edge lines 49 and 49'.

FIGS. 10A and 10B are cross-sectional views of the cutting edge 40 taken along lines A—A and B—B in FIG. 10. Cutting edge 40 follows a spiral path about the axis B and rake angle β preferably remains substantially constant along the length of the cutting edge, so that $\beta_A \approx \beta_B$, where $\beta_A$ and $\beta_B$ are the rake angles measured at cross sections A—A and B—B, respectively.

In accordance with a first preferred embodiment of the present invention, and as will be described in greater detail below, the insert 3 is thicker at its rear abutting portion than at its front abutting portion. In accordance with a second preferred embodiment of the present invention, the insert 3 has the same thickness at its rear abutting portion as it does at its front abutting portion.

Therefore, in accordance with the first preferred embodiment the rear edge lines of the insert should be seen in FIG. 9. However, in practice, in a front view of the insert of the first preferred embodiment, respective central and peripheral rear edge lines 48 and 49 almost overlap with respective central and peripheral front edge lines 46 and 47, respectively, and therefore cannot be seen. Similarly, respective central and peripheral rear edge lines 48' and 49' almost overlap with respective central and peripheral front edge lines 46' and 47', respectively, and therefore cannot be seen. The non-overlapping of these edge lines, in a front view, for an insert of the first preferred embodiment, will be discussed in detail below with reference to FIG. 11.

Figure 11:
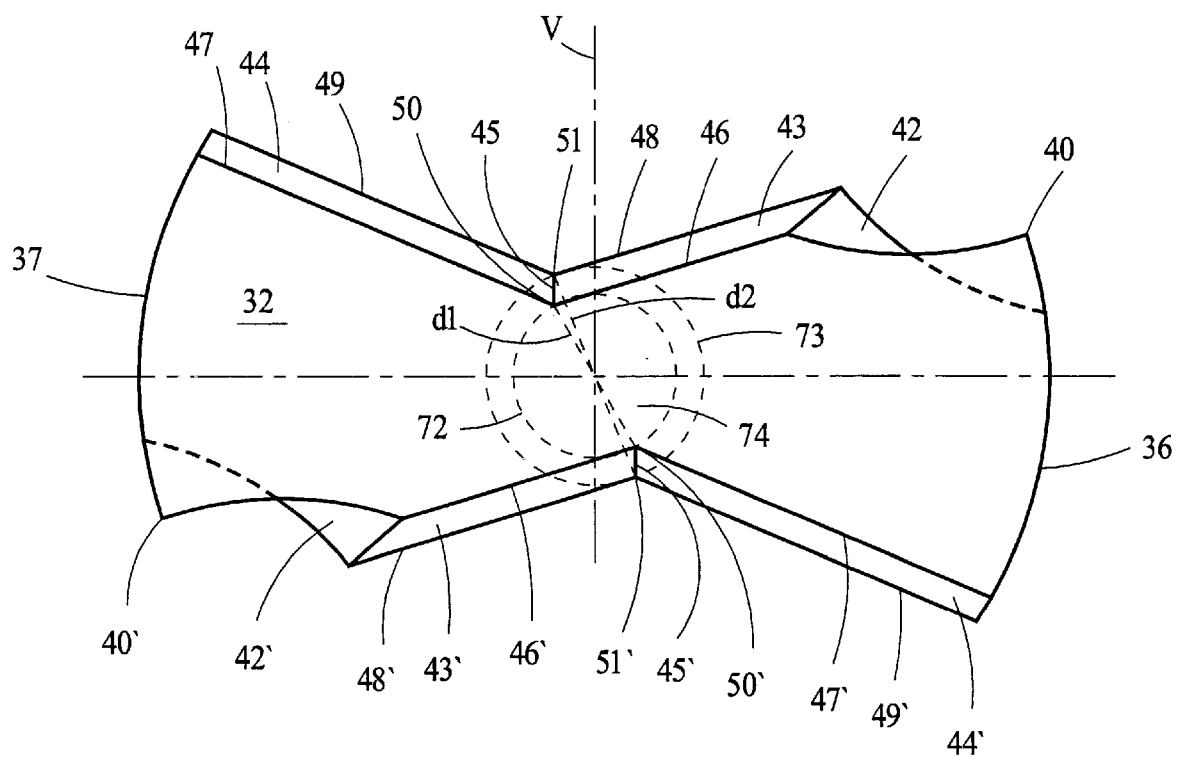
FIG. 11 is a schematic enlarged front view of an insert according to a first preferred embodiment of the present invention.

FIG. 11 shows schematically, in exaggeration, the disposition of the respective central and peripheral front edge lines 46, 46' and 47, 47' with respect to the respective central and peripheral rear edge lines 48, 48' and 49, 49', respectively. As can be seen, central front edge lines 46 and 46' are parallel to central rear edge lines 48 and 48', and, peripheral front edge lines 47 and 47' are parallel to peripheral rear edge lines 49 and 49'. For the insert top surface 34, central and peripheral front edge lines 46 and 47, respectively, meet at a front intersection point 50. Similarly, central and peripheral rear edge lines 48 and 49, respectively, meet at a rear intersection point 51. For the insert bottom surface 35, central and peripheral front edge lines 46' and 47', respectively, meet at a front intersection point 50'. Similarly, central and peripheral rear edge lines 48' and 49', respectively, meet at a rear intersection point 51'. The diameter of a first circle 72 passing through the two front intersection points 50 and 50' is denoted by d1 and the diameter of a second circle 73 passing through the two rear intersection points 51 and 51' is denoted by d2. By means of this construction insert top surface 34 and insert bottom surface 35 slope towards each other, from rear surface 33 towards front surface 32 so that the diameter d2 at the rear abutting portion 57 of the insert is greater than the diameter d1 at the front abutting portion 58 of the insert (see FIG. 10). Hence, in this respect insert 3 is thicker at its rear abutting portion than at its front abutting portion. As will be described below, this property of the insert provides positive axial locking of the insert in the tool. The first and second circles lie on a conical surface defining therein a central portion 74 of the insert.

As also described herein, for the insert top surface 34 first and second abutting surfaces 43 and 44, respectively, slope towards each other and inwardly towards the intermediate surface 45 with which they merge. Similarly, for the insert bottom surface 35, first and second abutting surfaces 43' and 44', respectively, slope inwardly towards the intermediate surface 45' with which they merge. This property can conveniently be phrased alternatively in the following manner: for the insert top surface 34 first and second abutting surfaces 43 and 44, respectively, slope towards each other and inwardly towards the central portion 74 of the insert. Similarly, for the insert bottom surface 35, first and second abutting surfaces 43' and 44', respectively, slope towards each other and inwardly towards the central portion 74 of the insert. As will be described below, this property of the insert provides effective radial clamping of the insert in the tool.

Although intermediate surfaces 45 and 45' can be located substantially on the vertical plane V, which passes through the axis of rotation of the insert, it is preferable that they be located on either side of the vertical plane when the insert is oriented horizontally as shown in FIG. 11. For a given distance between the intermediate surfaces, an insert having intermediate surfaces on either side of the vertical plane will be stronger than an insert having intermediate surfaces located substantially on the vertical plane. It is further preferable that the intermediate surfaces 45 and 45' be located at equal distances from the vertical plane.

Figure 12A:
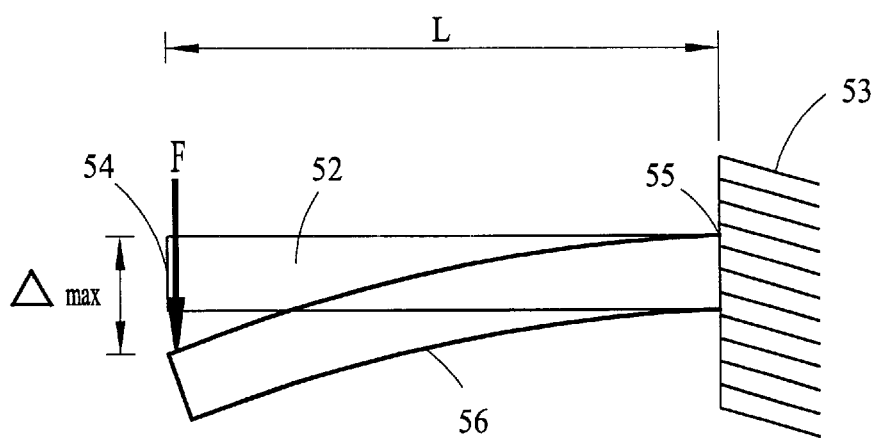
FIG. 12A is a schematic drawing illustrating the bending of a fixed beam.

Reference will now be made to FIGS. 12A–12D. As can be seen in FIG. 12A, a beam 52 of a length L is fixed perpendicularly to a rigid support 53. A force F applied perpendicularly on the free end 54 of the beam deflects the beam by an increasing amount, starting from zero deflection at the fixed end 55 of the beam and terminating in maximum deflection $\Delta_{max}$ at the free end 54 of the beam. The beam deflection follows an elastic bending curve, which for small deflections is approximately a parabolic path 56.

Figure 12B:
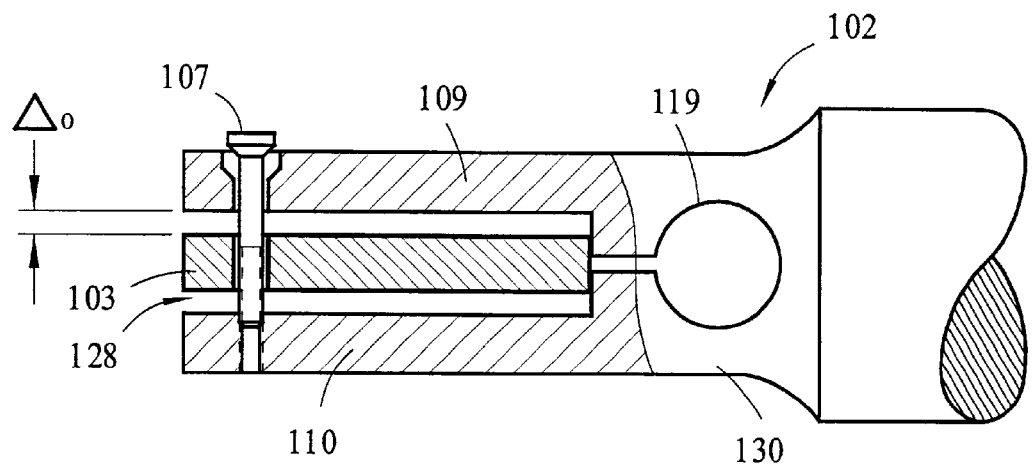
FIG. 12B is a schematic partially sectioned side view showing the clamping of a flat insert before clamping.
Figure 12C:
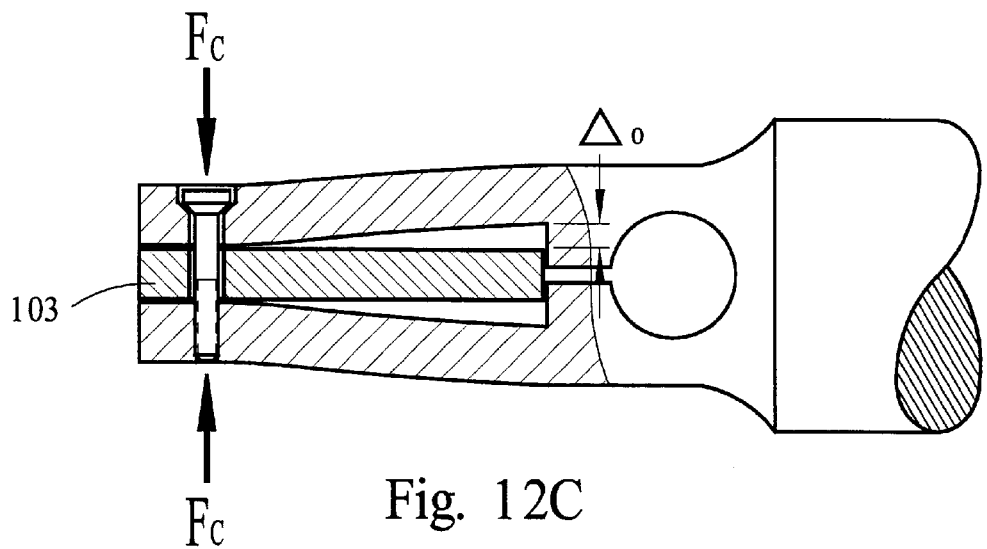
FIG. 12C is a schematic partially sectioned side view showing the clamping of a flat insert after clamping.

The deflection of clamping jaws 9 and 10 is analogous in general to the beam deflection described above. FIGS. 12B and 12C illustrate the clamping of a flat insert 103 using one clamping screw only. The figures show a tool 102 in accordance with the present invention, similar in construction to the tool 2 shown in FIG. 2 but using one clamping screw only. The tool 102 has clamping jaws 109 and 110 and stress equalizing flexibilizing bore 119. The insert 103 is similar to the insert 3 of the present invention but has the same thickness at its rear and front abutting portions in the sense described above. FIG. 12B shows the situation before clamping the insert 103. The base 130 of the clamping jaws serves as a base of deflection. In order to slide an insert into the insert receiving slot 128, a certain primary clearance $\Delta_0$ should be provided between the insert abutting surfaces and the abutment surfaces of the clamping jaws. It should be appreciated that the primary clearance $\Delta_0$ is shown greatly exaggerated for illustrative purposes. FIG. 12C shows the insert clamped in the tool. The screw 107 exerts a clamping force Fc on the clamping jaws 109 and 110 and hence presses them against the insert 103. As can be seen, the insert is clamped just in a small area adjacent the screw whereas most of its abutting surface remains non-abutted.

Figure 12D:
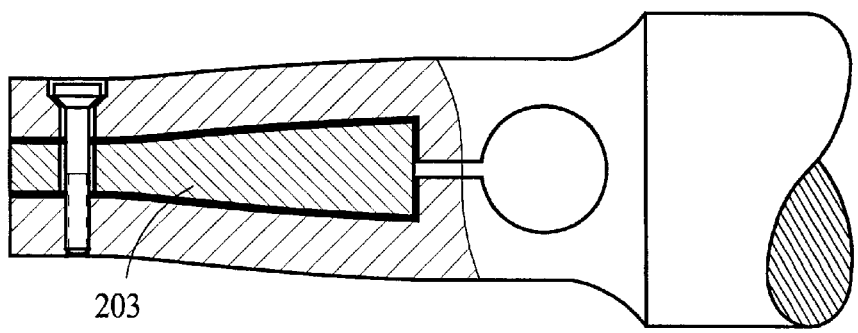
FIG. 12D is a schematic partially sectioned side view of the tool shown in FIG. 12C clamping an insert according to the present invention.

In accordance with the present invention an insert having a shape that will fill the entire gap between the deflected clamping jaws is used, thereby providing maximum clamping contact area and hence greater stability and less stress concentration. The required insert is, as described above, thicker at its rear abutting portion than at its front abutting portion. FIG. 12D shows a schematic disposition of an insert 203 according to the present invention when clamped according to the above description. The insert 203 is similar in structure to insert 3, however, it only has one through bore. The clamping jaws abut the insert along the whole length of the insert abutting surfaces.

Only one screw bore is used in FIGS. 12B to 12D for illustrational purposes. However, in practice two screw bores are used (see, for example, FIG. 1). The longitudinal profile of the insert preferably follows the elastic bending curve of the clamping jaws of the tool. By way of this construction positive axial locking of the insert is obtained, ensuring no axial movement of the insert relative to the tool during machining. Positive axial locking refers to the situation wherein the axial component of the clamping force applied on the insert abutting surfaces along, at least, a portion thereof is directed towards the rear-abutting portion of the insert.

Figure 13A:
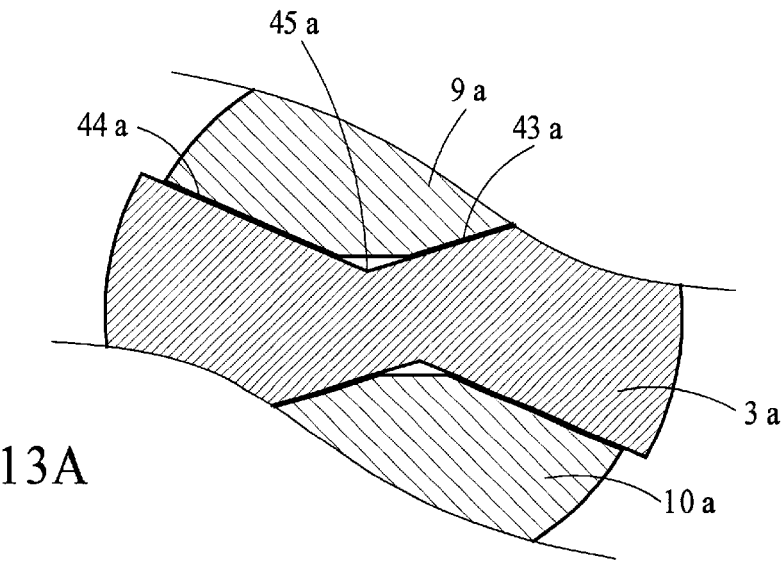
FIG. 13A is a schematic partial cross-section of the cutting tool assembly shown in FIG. 1 taken in a plane perpendicular to axis A through a region of abutment between the insert and the clamping jaws of the tool, wherein the intermediate surfaces are lines.
Figure 13B:
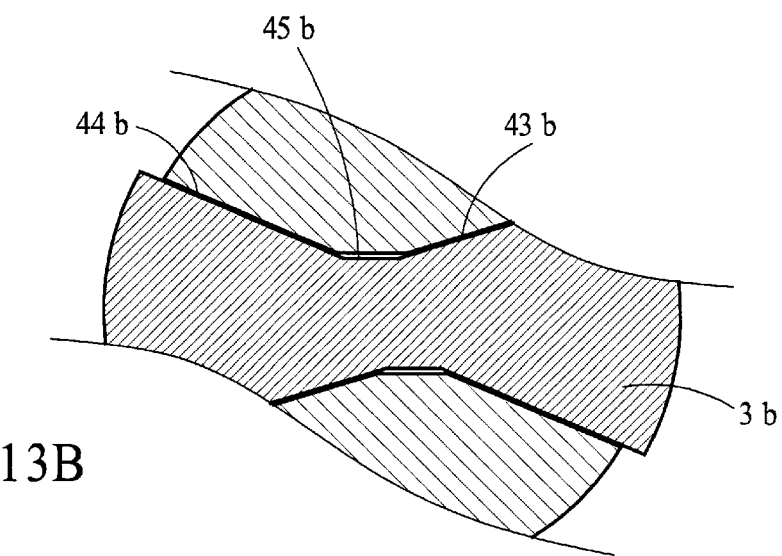
FIG. 13B is a schematic partial cross-section of the cutting tool assembly shown in FIG. 1 taken in a plane perpendicular to axis A through a region of abutment between the insert and the clamping jaws of the tool, wherein the intermediate surfaces have straight cross sections.
Figure 13C:
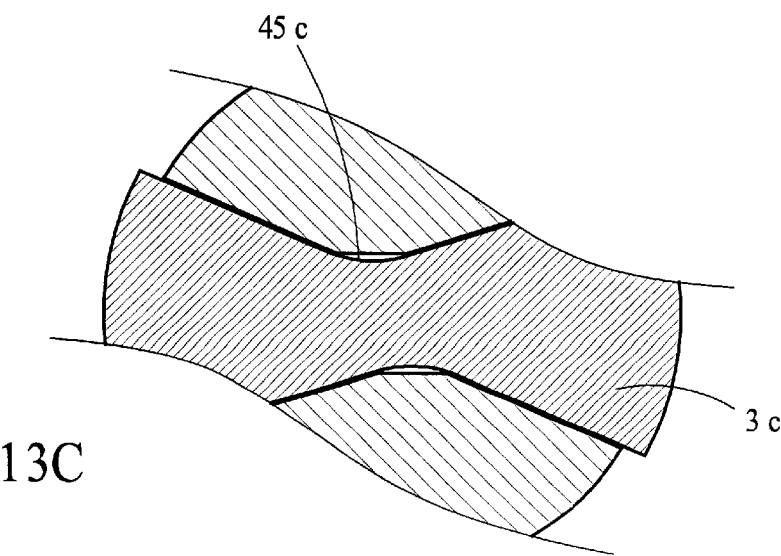
FIG. 13C is a schematic partial cross-section of the cutting tool assembly shown in FIG. 1 taken in a plane perpendicular to axis A through a region of abutment between the insert and the clamping jaws of the tool, wherein the intermediate surfaces have curved cross sections.

FIG. 13A shows an insert 3a, similar to insert 3 described above, clamped between clamping jaws 9a and 10a. Abutment surfaces 43a and 44a of the top surface of the insert meet at an intermediate surface 45a which, in this case, is a line. The bottom surface of the insert is of a similar construction. The intermediate surface is not, however, restricted to a line. FIGS. 13B and 13C show two other possible forms for the intermediate surface. In FIG. 13B the intermediate surface 45b, of insert 3b, has a straight cross-section. The thickness of the insert is defined in a similar manner to the way that it is defined for insert 3 with reference to FIG. 11. However, since in the present case neither the abutment surfaces of the top surface of the insert, nor the abutment surfaces of the bottom surface thereof meet at a line, a generalized definition for the thickness of the insert has to be used. The following generalization of the definition of the thickness of an insert, based on the definition given for insert 3, is used. For the top surface of the insert, imaginary planes are drawn through, and parallel to, the abutment surfaces 43b and 44b. The intersection of the imaginary planes defines an imaginary line analogous to line 45 in FIG. 11. In a similar manner an imaginary line of intersection for the abutment surfaces of the bottom surface of the insert is constructed. The thickness of the insert at any point along the axis of the insert is given by the diameter of a circle tangent to the two imaginary lines, with the plane of the circle being perpendicular to the axis of the insert and including the point along the axis at which the thickness is being determined. The diameter of the circle is not greater than the distance between the two imaginary lines at the point along the axis at which the thickness is being determined. Since the actual thickness of the insert at a given point along the axis varies across the cross section of the insert taken at that given point, it will be appreciated that the definition used herein serves the sole purpose of conveying the fact that the rear of the insert is in some sense thicker than the front of the insert, as illustrated by insert 203 in FIG. 12D.

FIG. 13C shows yet another form of intermediate surface. Insert 3c has an intermediate surface 45c which has a curved cross-section. The thickness of the insert in this case is defined in a similar manner to the definition given above with reference to insert 3b.

As shown in FIGS. 7 and 9, the construction of the insert according to the invention, and, in particular, the relative disposition of first abutting surfaces 43 and 43' and second abutting surfaces 44 and 44', is such that the side surfaces 36 and 37 are relatively thick thereby enabling the construction of the long peripheral spiral cutting edges 40 and 40'. Hence, such an insert is suitable, inter alia, for end milling finishing operations.

Figure 14A:
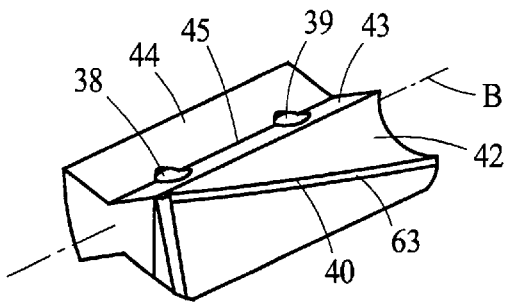
FIG. 14A is a perspective view of an insert with a single cutting edge in accordance with the present invention.
Figure 14B:
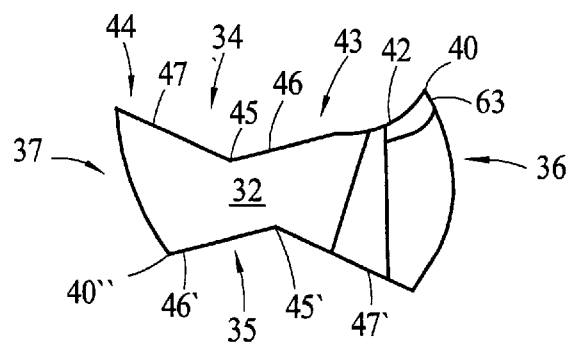
FIG. 14B is a front view of the insert shown in FIG. 14A.
Figure 14C:
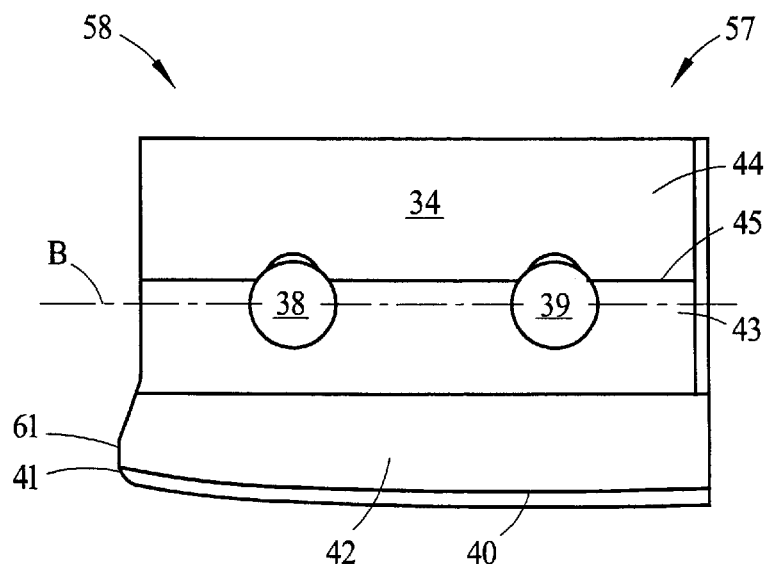
FIG. 14C is a top view of the insert shown in FIG. 14A.

Although the present invention has been described to a certain degree of particularity, it should be understood that various alterations and modifications can be made without departing from the spirit or scope of the invention as hereinafter claimed. In particular, as shown in FIGS. 14A to 14C, the insert may have only one cutting edge 40. This is particularly useful if the cutting edge has a complex contour, in which case it may be difficult to reproduce the same contour precisely on two cutting edges. In this case top surface 34 of the insert will not be identical to bottom surface 35. As shown, top surface 34 merges with side surface 36 at cutting edge 40, whereas bottom surface 35 merges with side surface 37 along edge 40" that does not constitute a cutting edge. It should be noted that the edge 40" does not necessarily have to be a line and can be a region of any convenient cross section connecting bottom surface 35 with side surface 37.

In general, the front surface 32 of the insert of the invention is not restricted to the shape shown in the figures, but can be of any required shape and can include a cutting edge.

Any of the above mentioned modifications are acceptable provided that the general shape and orientation of abutting surfaces 43, 43', 44 and 44' are of the form described and illustrated. This being the case, there will be positive axial locking of the insert in the tool and effective radial clamping in a double dove-tail manner.

Figure 15:
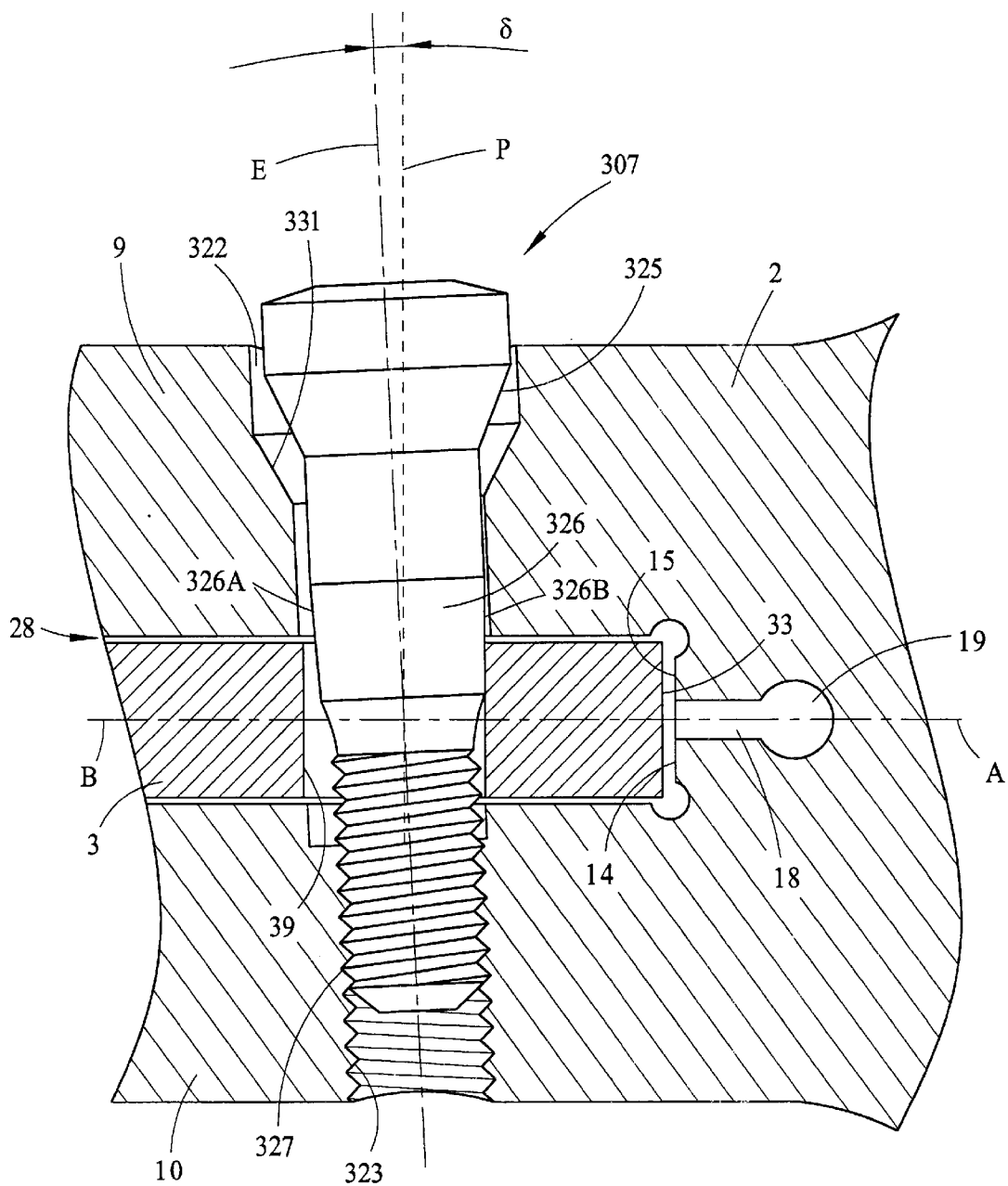
FIG. 15 is a schematic enlarged partial cross section of a cutting tool assembly according to the present invention, with a different clamping arrangement, showing a first stage of tightening of a clamping screw.
Figure 16:
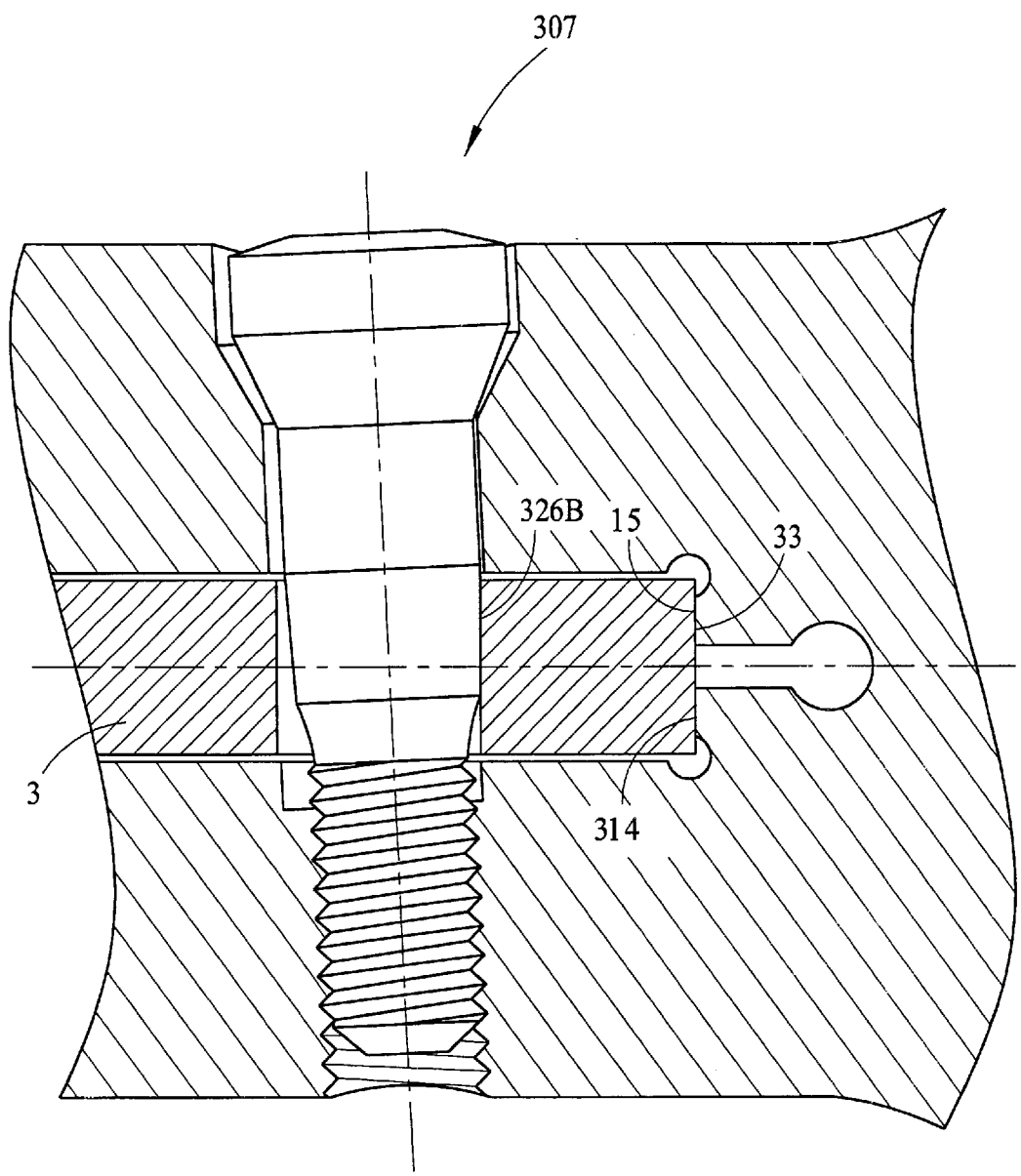
FIG. 16 is a schematic enlarged partial cross section of a cutting tool assembly according to the present invention, with a different clamping arrangement, showing a second stage of tightening of a clamping screw.
Figure 17:
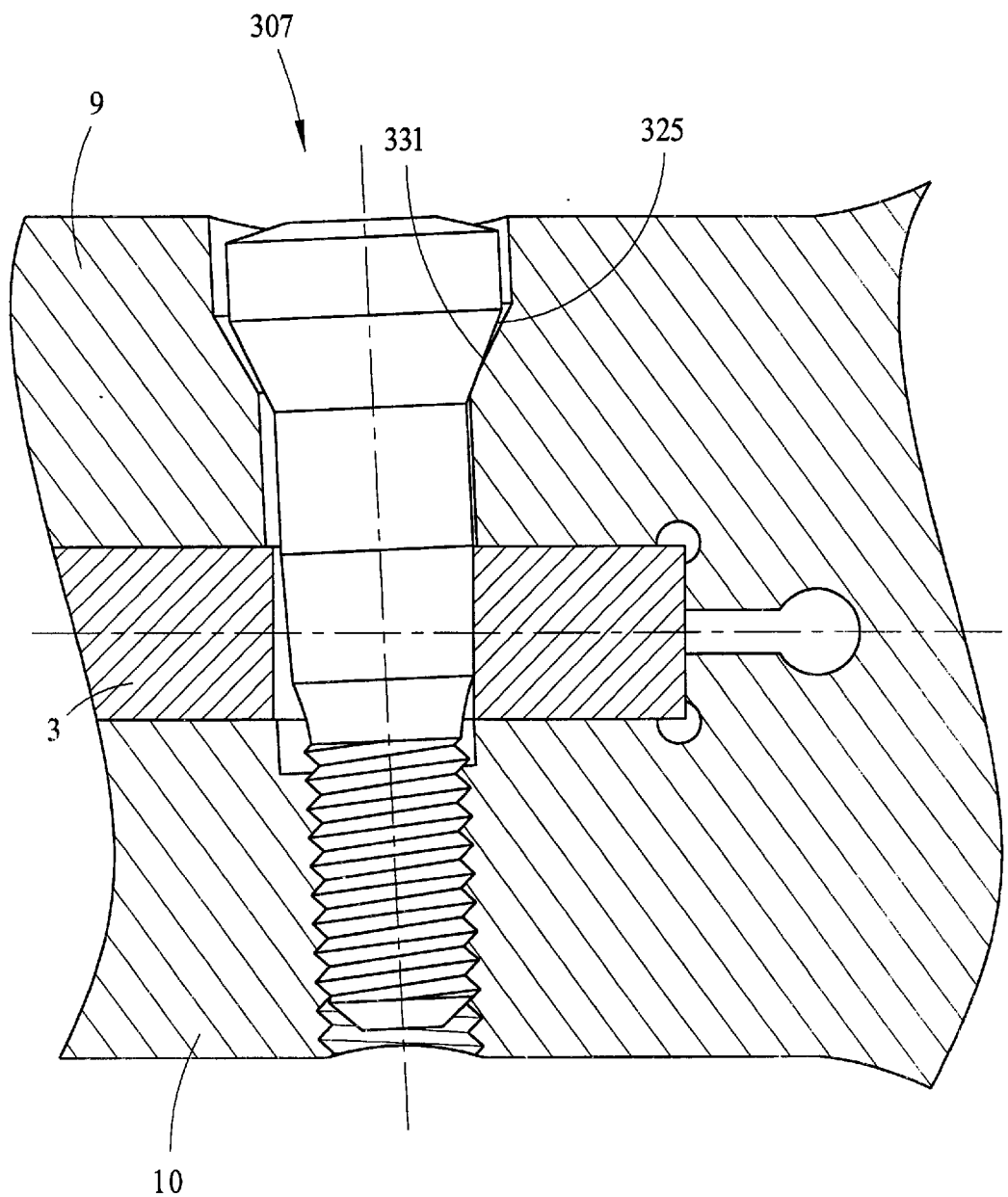
FIG. 17 is a schematic enlarged partial cross section of a cutting tool assembly according to the present invention, with a different clamping arrangement, showing a third stage of tightening of a clamping screw.

Attention is now drawn to FIGS. 15 to 17, showing an arrangement between a clamping screw and a through bore of the insert, whereby the screw causes positive axial locking of the insert. FIG. 15 shows an insert 3 having an axis of rotation B that is mounted into an insert receiving slot 28 of a tool 2 having an axis of rotation A. When the insert 3 is mounted in the tool 2 its axis of rotation B coincides with the axis of rotation A of the tool 2. The insert receiving slot 28 has respective first and second rear abutment surfaces 14 and 15, intermediate slot 18 and stress equalizing flexibilizing bore 19. The insert 3 has a through bore 39 and a rear surface 33. A clamping screw 307 has an axis E, a screw head tapered portion 325, screw conical portion 326 and screw threaded portion 327. The tool 2 has clamping jaws 9 and 10. A screw bore 322 in the clamping jaw 9 has a tapered portion 331 and is aligned with a threaded screw bore 323 in the clamping jaw 10.

The screw conical portion 326 is slanted at an angle δ of about 2.5° with respect to the axis E. The axis E is slanted at the same angle δ with respect to a radial direction P perpendicular to the axis A. The screw conical portion 326 has a forwardly facing portion 326A and a rearwardly facing portion 326B. The term rearwardly refers to a direction from the open side of the insert receiving slot 28 towards the rear abutment surfaces 14 and 15. The rearwardly facing portion 326B is perpendicular to the axis A and parallel to the through bore 39 of the insert 3.

The tightening of the screw 307 is described as a three stage process. In the first stage, as shown in FIG. 15, the screw threaded portion 327 is engaged into the threaded screw bore 323. At this stage, the rearwardly facing portion 326B touches the rear side of the through bore 39, and the rear surface 33 of the insert 3 is not yet in abutment with the rear abutment surfaces 14 and 15 of the insert receiving slot 28. In the second stage, as shown in FIG. 16, the screw 307 is further tightened. Due to the angle δ by which the screw 307 is slanted with respect to the radial direction P, the rearwardly facing portion 326B pushes the insert 3 rearwardly till the rear surface 33 of the insert firmly abuts against the rear abutment surfaces 14 and 15. In the third stage, as shown in FIG. 17, the screw 307 is further tightened till the screw head tapered portion 325 firmly abuts against the tapered portion 331 of the screw bore 322. In this position, the clamping jaws 9 and 10 approach each other thus abutting the insert 3 along its length.

By way of the above description the insert 3 is positively axially locked by the screw. It should be understood that if applied to the cutting tool shown in FIG. 2, the positive axial locking can be similarly applied with either screw 7 or screw 8.

What is claimed is:
1. A cutting tool assembly (1) rotatable about an axis of rotation (A), the cutting tool assembly comprising a tool (2) and a replaceable insert (3) mountable therein, said tool comprising two substantially equal clamping jaws (9,10) spaced apart by an insert receiving slot (28), each of said clamping jaws being provided with at least one screw bore (20, 21, 22, 23) and comprising a peripheral surface (11), a peripheral abutment surface (12), and a central abutment surface (13) joined to the peripheral abutment surface (12) via a connecting surface (29), said peripheral abutment surface and said central abutment surface forming therebetween a first angle (α) of less than 180° and being substantially parallel to said axis of rotation (A);

said insert having an axis of rotation (B) and comprising a central portion (74), a front surface (32), a rear surface (33), top and bottom surfaces (34, 35) having at least one through bore (38, 39), and side surfaces (36, 37) on opposite sides of said axis of rotation, said side surfaces merging with said top and bottom surfaces at edges (40, 40'), at least one of said edges being a cutting edge, each of said top and bottom surfaces comprising first and second abutting surfaces (43, 43', 44, 44') connected to an intermediate surface (45, 45'), said first and second abutting surfaces forming therebetween a second angle (α'), each of said first and second abutting surfaces terminating in a front abutting portion (58) having, respectively, central (46, 46') and peripheral (47, 47') front edge lines, and in a rear abutting portion (57) having, respectively, central (48, 48') and peripheral (49, 49') rear edge lines, said peripheral front edge lines being parallel to said peripheral rear edge lines, and said central front edge lines being parallel to said central rear edge lines, wherein said first and second abutting surfaces (43, 44) of said top surface (34) slope towards each other and inwardly towards the central portion (74) of said insert and said first and second abutting surfaces (43', 44') of said bottom surface (35) slope towards each other and inwardly towards the central portion (74) of said insert, and wherein the peripheral and the central abutment surfaces of each camping jaw abut corresponding first and second abutting surfaces of the insert, respectively, when the insert is mounted in the insert receiving slot.

2. A cutting tool assembly (1) according to claim 1, wherein said insert (3) is thicker at its rear abutting portion than at its front abutting portion.

3. A cutting tool assembly (1) according to either of claims 1 or 2, wherein said first and second abutting surfaces are flat.

4. A cutting tool assembly (1) according to either of claims 1 or 2, wherein said cutting edge follows a spiral path about the axis of rotation (B).

5. A cutting tool assembly (1) according to either of claims 1 or 2, wherein said insert has two through bores (38, 39).

6. A cutting tool assembly (1) according to claim 1, wherein the intermediate surface belonging to the top surface of the insert and the intermediate surface belonging to the bottom surface of the insert are located on either side of a vertical plane (V) passing through the axis of rotation (B) of the insert, when the insert is oriented horizontally.

7. A cutting tool assembly (1) according to claim 6, wherein the intermediate surfaces are located at equal distances from said vertical plane.

8. A cutting tool assembly (1) according to claim 6, wherein the intermediate surfaces are lines.

9. A cutting tool assembly (1) according to claim 6, wherein the intermediate surfaces have straight cross-sections in a plane perpendicular to the axis of rotation (B).

10. A cutting tool assembly (1) according to claim 6, wherein the intermediate surfaces have curved cross-sections in a plane perpendicular to the axis of rotation (B).

11. A cutting tool assembly (1) according to claim 1 wherein said second angle (α') is smaller than said first angle (α).

12. A cutting tool assembly (1) according to either of claims 1 or 2, wherein said insert receiving slot terminates in an intermediate slot (18).

13. A cutting tool assembly (1) according to claim 12, wherein said intermediate slot terminates in a stress equalizing flexibilizing bore (19).

14. An insert (3) for clamping in a clamping tool between clamping jaws, said insert having an axis of rotation (B) and comprising a central portion (74), a front surface (32), a rear surface (33), top and bottom surfaces (34, 35) and side surfaces (36, 37) on opposite sides of said axis of rotation (B), said side surfaces merging with said top and bottom surfaces at edges (40, 40'), at least one of said edges being a cutting edge, each of said top and bottom surfaces comprising first and second abutting surfaces (43, 43', 44, 44') connected to an intermediate surface (45 45'), said first and second abutting surfaces forming therebetween a first angle (α'), each of said first and second abutting surfaces terminating in a front abutting portion (58) having, respectively, central (46, 46') and peripheral (47, 47') front edge lines and in a rear abutting portion (57) having, respectively, central (48, 48') and peripheral (49, 49') rear edge lines, wherein said first and second abutting surfaces of said top surface slope towards each other and inwardly towards said central portion of said insert and wherein said first and second abutting surfaces of said bottom surface slope towards each other and inwardly towards said central portion of said insert, and wherein the insert is asymmetric with respect to a vertical plane (V) in which the axis of rotation (B) lies.

15. An insert (3) according to claim 14, wherein said insert is thicker at its rear abutting portion than at its front abutting portion.

16. An insert (3) according to claim 14, wherein said peripheral front edge lines are parallel to said peripheral rear edge lines, and said central front edge lines are parallel to said central rear edge lines.

17. An insert (3) according to either of claims 14 or 15, wherein said first and second abutting surfaces are flat.

18. An insert (3) according to either of claims 14 or 15, wherein said at least one cutting edge follows a spiral path about the axis of rotation (B).

19. An insert (3) according to claim 14, wherein the intermediate surface belonging to the top surface of the insert and the intermediate surface belonging to the bottom surface of the insert are located on either side of a vertical plane (V) passing through the axis of rotation (B) of the insert when the insert is oriented horizontally.

20. An insert (3) according to claim 19, wherein the intermediate surfaces are located at equal distances from said vertical plane (V).

21. An insert (3) according to claim 19, wherein the intermediate surfaces are lines.

22. An insert (3) according to claim 19, wherein the intermediate surfaces have straight cross-sections in a plane perpendicular to the axis of rotation (B).

23. An insert (3) according to claim 19, wherein the intermediate surfaces have curved cross-sections in a plane perpendicular to the axis of rotation (B).

24. An insert (3) according to either of claims 14 or 15, wherein said insert is further provided with at least one through bore (38, 39).

25. An insert (3) according to claim 24, wherein said at least one through bore is provided in said top and bottom surfaces.

26. A cutting tool assembly (1) rotatable about an axis of rotation (A) the cutting tool assembly comprising
- a tool (2), a replaceable insert (3) mountable therein and at least one clamping screw (307), said tool comprising two substantially equal clamping jaws (9,10) spaced apart by an insert receiving slot (28) having at least one rear abutment surface (14, 15), each of said clamping jaws being provided with at least one screw bore (20, 21, 22, 23) slanted at a first angle (δ) with respect to a line (P) perpendicular to the axis of rotation of the cutting tool assembly and having at least one screw bore tapered portion (331), each of said clamping jaws comprising a peripheral surface (11), a peripheral abutment surface (12) and a central abutment surface (13), said peripheral abutment surface and said central abutment surface being substantially parallel to said axis of rotation (A);
- said insert having an axis of rotation (B) and comprising a central portion (74), a front surface (32), a rear surface (33), top and bottom surfaces (34, 35) having at least one through bore (38, 39) substantially aligned with said at least one screw bore, and side surfaces (36, 37) on opposite sides of said axis of rotation, said side surfaces merging with said top and bottom surfaces at edges (40, 40'), at least one of said edges being a cutting edge,
- each of said top and bottom surfaces comprising first and second abutting surfaces (43, 43', 44, 44'), each of said first and second abutting surfaces terminating in a front abutting portion (58) having, respectively, central (46, 46') and peripheral (47, 47') front edge lines, and in a rear abutting portion (57) having, respectively, central (48, 48') and peripheral (49, 49') rear edge lines, said peripheral front edge lines being parallel to said peripheral rear edge lines, and said central front edge lines being parallel to said central rear edge lines, wherein said first and second abutting surfaces of said top surface slope towards each other and inwardly towards the central portion of said insert and said first and second abutting surfaces of said bottom surface slope towards each other and inwardly towards the central portion of said insert;
- said clamping screw (307) has an axis (E), a screw head tapered portion (325), a screw cylindrical portion (326) slanted at said first angle (δ) with respect to the axis (E) and a screw threaded portion (327), and wherein
  - in an assembled position, the insert rear abutment surface (33) abuts the at least one rear abutment surface (14, 15), the screw cylindrical portion (326) abuts the at least one insert through bore (38, 39), the screw head tapered portion (325) abuts the screw bore tapered portion (331) and the peripheral abutment surfaces (12) and central abutment surfaces (13) of the clamping jaws (9, 10) abut the first and second abutting surfaces (43, 43', 44, 44') of the insert.

27. A cutting tool assembly (1) according to claim 26, wherein the insert is thicker at its rear abutting portion than at its front abutting portion.

28. A cutting tool assembly comprising:
- a tool having a first axis of rotation and including a clamping portion having unitary construction and comprising first and second clamping jaws spaced apart from one another by an insert receiving slot, the first and second clamping jaws being provided with respective first and second screw bores aligned with one another, each clamping jaw also having a peripheral abutment surface, a central abutment surface and a connecting surface connecting the peripheral and central abutment surfaces, the peripheral abutment surface and the central abutment surface being non-coplanar; and
- a cutting insert having a second axis of rotation and comprising a central portion, top and bottom surfaces, and side surfaces on opposite sides of said second axis of rotation, the side surfaces merging with said top and bottom surfaces at edges, at least one of said edges being a cutting edge, and at least one insert through bore passing through said top, and bottom surfaces, each of said top and bottom surfaces comprising first and second abutting surfaces and an intermediate surface connecting the first and second abutting surfaces, the first and second abutting surfaces being non-coplanar; wherein
  - the peripheral and the central abutment surfaces of each clamping jaw abut corresponding first and second abutting surfaces of the insert, respectively, and the at least one insert through bore is aligned with the first and second screw bores, when the insert is mounted in the insert receiving slot.

29. A cutting tool assembly according to claim 28, wherein
- the peripheral abutment surface and the central abutment surface form therebetween a first angle (α) of less than 180°, and
- the first and second abutting surfaces form therebetween a second angle (α') of less than 180°.

30. A cutting tool assembly according to claim 29, wherein the second angle (α') is smaller than the first angle (α).

31. A cutting tool assembly according to claim 28, wherein
each clamping jaw is provided with two screw bores, and the insert is provided with two insert through bores.

32. A cutting tool assembly according to claim 28, wherein the intermediate surface belonging to the top surface of the insert and the intermediate surface belonging to the bottom surface of the insert are located on either side of an imaginary vertical plane passing through the second axis of rotation of the insert, when the insert is oriented horizontally.

33. A cutting insert having an axis of rotation and comprising a central portion, top and bottom surfaces, and side surfaces on opposite sides of said second axis of rotation, the side surfaces merging with said top and bottom surfaces at edges, at least one of said edges being a cutting edge, and at least one insert through bore passing through said top and bottom surfaces, each of said top and bottom surfaces comprising first and second abutting surfaces and an intermediate surface connecting the first and second abutting surfaces, the first and second abutting surfaces being non-coplanar, and wherein
the intermediate surface belonging to the top surface of the insert and the intermediate surface belonging to the bottom surface of the insert are located on different sides of an imaginary vertical plane passing through the axis of rotation of the insert, when the insert is oriented horizontally.

34. An insert according to claim 33, wherein the insert is thicker at a rear abutting portion thereof than at a front abutting portion thereof.

35. An insert according to claim 33, wherein said at least one cutting edge follows a spiral path about the insert's axis of rotation.

* * * * *